United States Patent
Tzeng

(10) Patent No.: US 11,442,479 B2
(45) Date of Patent: Sep. 13, 2022

(54) INTELLIGENT WATER OUTLET DEVICE

(71) Applicant: NCIP INC., Taipei (TW)

(72) Inventor: Rong-Chyan Tzeng, Taipei (TW)

(73) Assignee: NCIP INC., Taipei (TW)

(*) Notice: Subject to any disclaimer, the term of this patent is extended or adjusted under 35 U.S.C. 154(b) by 323 days.

(21) Appl. No.: 16/815,582

(22) Filed: Mar. 11, 2020

(65) Prior Publication Data
US 2021/0286386 A1    Sep. 16, 2021

(51) Int. Cl.
*G05D 23/19*    (2006.01)

(52) U.S. Cl.
CPC ..... *G05D 23/1927* (2013.01); *G05D 23/1917* (2013.01)

(58) Field of Classification Search
CPC .......... G05D 23/1353; G05D 23/1306; G05D 23/1326; G05D 23/1333
See application file for complete search history.

(56) References Cited

U.S. PATENT DOCUMENTS

| | | | |
|---|---|---|---|
| 2007/0246550 A1* | 10/2007 | Rodenbeck | G05D 23/1353 236/12.11 |
| 2011/0185493 A1* | 8/2011 | Chen | E03C 1/057 236/12.12 |

* cited by examiner

*Primary Examiner* — Nelson J Nieves
*Assistant Examiner* — Meraj A Shaikh
(74) *Attorney, Agent, or Firm* — WPAT, PC

(57) ABSTRACT

An intelligent water outlet device includes a water-temperature regulating valve, a water-output control valve, a power source unit, an input unit, a motor drive unit, a first step motor, a second step motor and a control unit. The power source unit energizes the water outlet device. The input unit selects a temperature value for the water output. The motor drive unit drives the first step motor and second step motor, to rotate an adjusting bar of the water-temperature regulating valve and to push a valve bar of the water-output control valve, respectively. The control unit receives a temperature option and an expected water volume from the input unit, and then controls the first step motor and the second step motor to output warm water with the inputted temperature value and the expected water volume.

6 Claims, 8 Drawing Sheets

INTELLIGENT WATER OUTLET DEVICE

TECHNICAL FIELD

The present disclosure relates in general to an intelligent water outlet device that applies an electronic system to control step motors to adjust a mixing ratio of cold and hot water, and further to supply water by different output volumes, such that intellectualized control, at least in saving water, can be obtained.

BACKGROUND

Currently, one of mainstreams in modern buildings is intellectualization. A typical intellectualized building is the smart home that utilizes a digital housing system based on an embedded system and the network communication technology. The digital housing system, including a digital family and an energy conservation design, can construct an integral and seamless online community integrated with communications, securities, logistics and other auxiliary services.

The digital family is featured with various domestic digital-controllable products, such as door locks, lamps, fans, televisions and the like appliances. In particular, the most popular water outlet device is an infrared sensor faucet.

In various reports, it is convinced that, besides foods, the water resource is quite possible to face a shortage problem. Recently, lots of major countries in the world have raised versatile policy means to promote water-saving devices and related subsidies for preserving water resource in both personal and domestic water consumption. In water-temperature control, a conventional manual-operated water outlet device (for example, a faucet, a bidet) can supply water in a specific ratio of cold and hot water that is manually adjusted by evaluating comfort of the human body. However, such a means to adjust the water temperature would definitely waste water resource to some degree for sacrificing plenty of irrelevant-temperature water prior to have the water to reach a satisfied temperature.

In the coming future, intellectualization upon major ordinary-life products would be inevitable. Actually, booming of intellectualized appliances now in the marketplace has explained this trend. However, there is work yet to be done for the water outlet device to be intellectualized.

SUMMARY

An object of the present disclosure is to provide an intelligent water outlet device, that introduces a microcomputer electronic control system to control a water-temperature regulating valve so as to reach a preferred mixing ratio of cold and hot water, such that satisfied warm water can be provided much more rapidly without wasting additional water than the conventional manual means by body trial.

Another object of the present disclosure is to provide an intelligent water outlet device, that applies a microcomputer electronic control system to control the water output, such that various benefits in smart control can be obtained.

In this disclosure, the intelligent water outlet device includes a water-temperature regulating valve, a power source unit, a input unit, a first step motor, a motor drive unit, a control unit. The water-temperature regulating valve has an adjusting bar and at least one water outlet, and a mixing ratio of cold and hot water can be obtained by rotating the adjusting bar. The power source unit is used for receiving a DC power to energizing the intelligent water outlet device. The input unit has at least two temperature buttons for inputting different temperature values. The first step motor has a rotational power output shaft coaxial and integrally connected with the adjusting bar of the water-temperature regulating valve, and the power output shaft is used for rotating the adjusting bar. The control unit is used for receiving the temperature value inputted at the input unit, and transmitting a message to the motor drive unit for driving the power output shaft of the first step motor to rotate the adjusting bar of the water-temperature regulating valve to a corresponding angle so as to have the water-temperature regulating valve to output warm water having the inputted temperature value.

In one embodiment of this disclosure, the intelligent water outlet device further includes a water outlet pipe, a water-output control valve disposed at the water outlet pipe, and a second step motor. One end of the water outlet pipe is connected with the water outlet of the water-temperature regulating valve. The water-output control valve is furnished with an oblique-push valve bar for providing an angle of inclination to determine the water output of the water-supply adjusting valve. The second step motor has a telescoping power output shaft driven by the motor drive unit, and the power output shaft is pivotally connected with the valve bar. In addition, the input unit is furnished with at least two water-feeding buttons for different water volumes, and the control unit drives the second step motor of the motor drive unit to protrude a power output shaft thereof by a predetermined length according to the inputted water volume at the input unit.

In one embodiment of this disclosure, the intelligent water outlet device further includes a water-temperature detecting unit for detecting a real-time water temperature inside the water-temperature regulating valve and then transmitting the real-time water temperature to the control unit. The control unit receives the temperature value inputted at the input unit and the real-time water temperature detected by the water-temperature detecting unit, transmits a corresponding message to the motor drive unit for driving the power output shaft of the first step motor to rotate the adjusting bar till when the inputted temperature value is equal to the detected real-time water temperature, and then has the motor drive unit to stop the first step motor.

When a temperature difference between the inputted temperature value and the detected real-time water temperature exceeds a preset allowable temperature difference, the control unit has the motor drive unit to reactive the first step motor till when the detected real-time water temperature is equal to the detected water temperature, and then has the motor drive unit to stop the first step motor.

The allowable temperature difference between the detected real-time water temperature and the inputted water temperature can be ±0.5° C.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
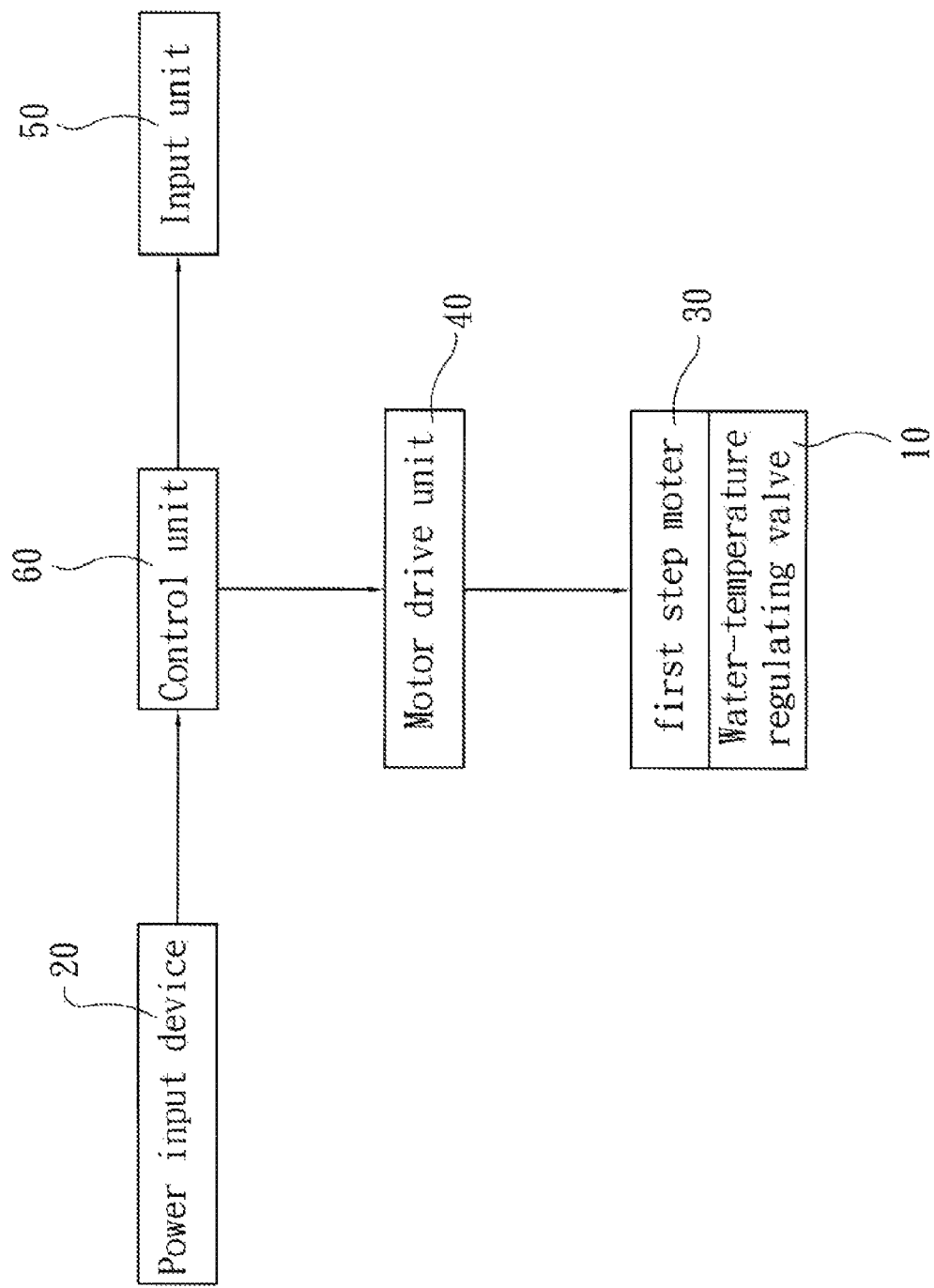
FIG. 1 is a schematic block diagram view of a first embodiment of the intelligent water outlet device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
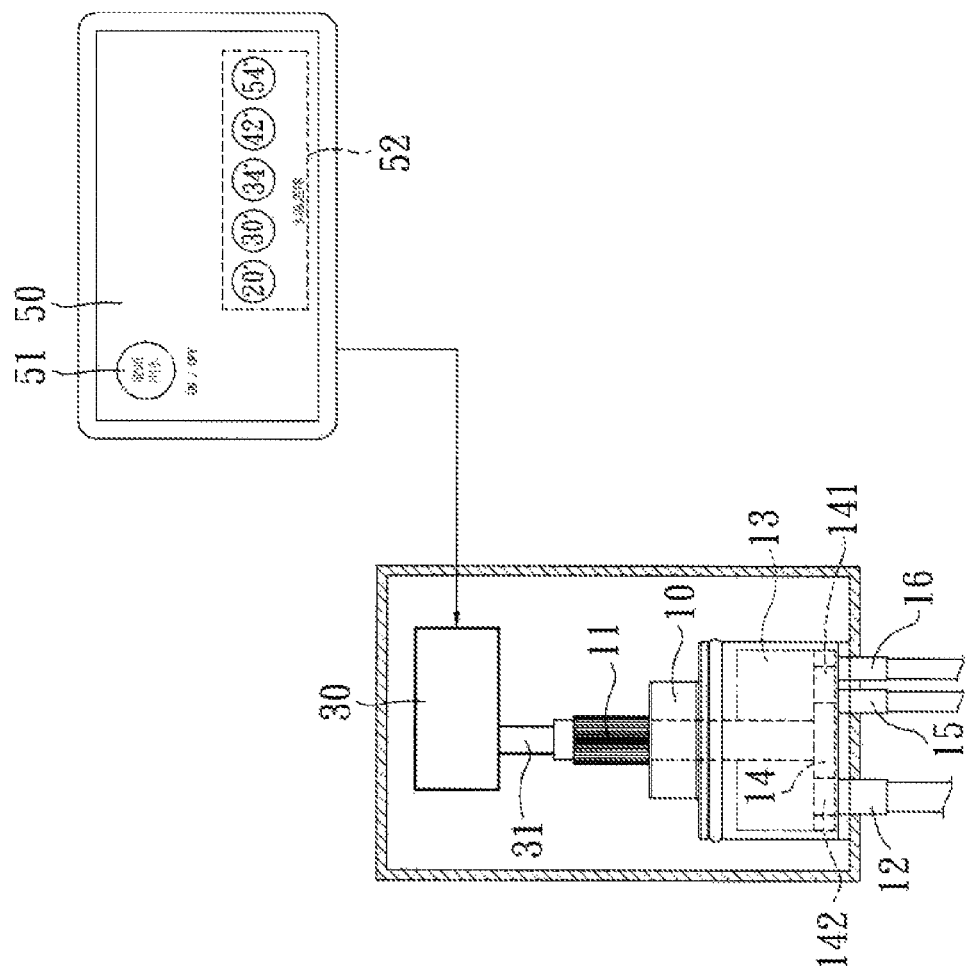
FIG. 2 is a schematic structural view of FIG. 1.

Refer now to FIG. 1 and FIG. 2. In this disclosure, an intelligent water outlet device is furnished with a water-temperature regulating valve 10, and the water-temperature regulating valve 10 includes an adjusting bar 11 and at least one water outlet 12. A mixing ratio of cold and hot water can be adjusted by rotating the adjusting bar 11. The water-temperature regulating valve 10 contains thereinside a water-mixing zone 13 for blending thereinside the cold water and the hot water into corresponding warm water. A lower end of the adjusting bar 11 is connected with a valve plate 14 having thereon at least two through holes 141, 142, in which the through hole 141 can be connected spatially with a cold-water feeding inlet 15 or/and a hot-water feeding inlet 16. By rotating the adjusting bar 11, overlapped areas between the through hole 141 and the cold-water feeding inlet 15 or/and the hot-water feeding inlet 16 would determine sizes of tunnels for allowing the cold and hot water to enter the water-mixing zone 13, such that the water temperature inside the water-mixing zone 13 can be adjusted. In the meantime, when the adjusting bar 11 is rotated, another through hole 142 would keep connecting spatially with the water outlet 12. Since the water-temperature regulating valve 10 is already an existing product in the marketplace, thus details thereabout would be omitted herein.

The intelligent water outlet device includes a power source unit 20, a first step motor 30, a motor drive unit 40, an input unit 50 and a control unit 60. The power source unit 20 is mainly to input DC power for operating the device of this disclosure. The power source unit 20 can be a DC power supply able to connect a domestic AC power for transforming an AC power into a corresponding DC power. In one embodiment, the input unit 50 is further furnished with a water-supply control button 51 for controlling or terminating the water output.

The first step motor 30 has a rotational power output shaft 31. The power output shaft 31 and the adjusting bar 11 of the water-temperature regulating valve 10 are coaxial and connected integrally as a unique piece. Thereupon, while the power output shaft 31 of the first step motor 30 is rotated, the adjusting bar 11 of the water-temperature regulating valve 10 can be rotated synchronously. In this disclosure, the first step motor 30 can be any step motor available already in the marketplace. Though the first step motor 30 is generally built in with a speed reduction mechanism (well known in the art) for reducing the rotational speed of the power output shaft, yet another external speed reduction mechanism (not shown in the figure) can be also furnished to the first step motor 30 for further reducing the rotational speed thereof.

The motor drive unit 40 can drive the first step motor 30 to perform a positive rotation, a negative rotation, or a 0-degre calibration. It is also well known that the motor drive unit 40 can be used for driving the first step motor 30, and a single motor drive unit 40 can be able to drive simultaneously more than one step motor.

On the input unit 50, at least two temperature buttons 52 for providing different temperature options are furnished for the user to determine an expected temperature of the warm water. Practically, 4-6 temperature buttons can be included, such as a button of cold water, a button of complete hot water, a button of low-temperature warm water (30° C. for example), a button of medium-temperature warm water (34° C. for example), a button of high-temperature warm water (40° C. for example), or a button for setting the water temperature arbitrarily.

The control unit 60 can receive the temperature value set at the input unit 50, and then transmit a message to the motor drive unit 40 for rotating the first step motor 30, such that the power output shaft 31 of the first step motor 30 can rotate the adjusting bar 11 as well to a corresponding angle. Thereupon, the water-temperature regulating valve 10 can provide the warm water at the desired temperature value. In this embodiment, the control unit 60 can have an angle range of 0°~90° for the first step motor 30. If the power output shaft 31 is provided with a 0° rotation, then complete cold water (about 20° C.) can be supplied. In another case that the power output shaft 31 is provided with a 90° rotation, then complete high-temperature water (about 54° C.) can be supplied. Further, if the power output shaft 31 is provided with a 45° rotation, then medium-temperature warm water (about 34° C.) can be supplied. According to this disclosure, when the water-temperature regulating valve is furnished with dual water outlets (not shown in the figure), a rotation range of the first step motor 30 can be a range of −90°~90°, in which the angling −90°~0° thereof is charged by the second water outlet (for example, one connected to a shower head) to supply warm water of another specific temperature range.

Figure 3:
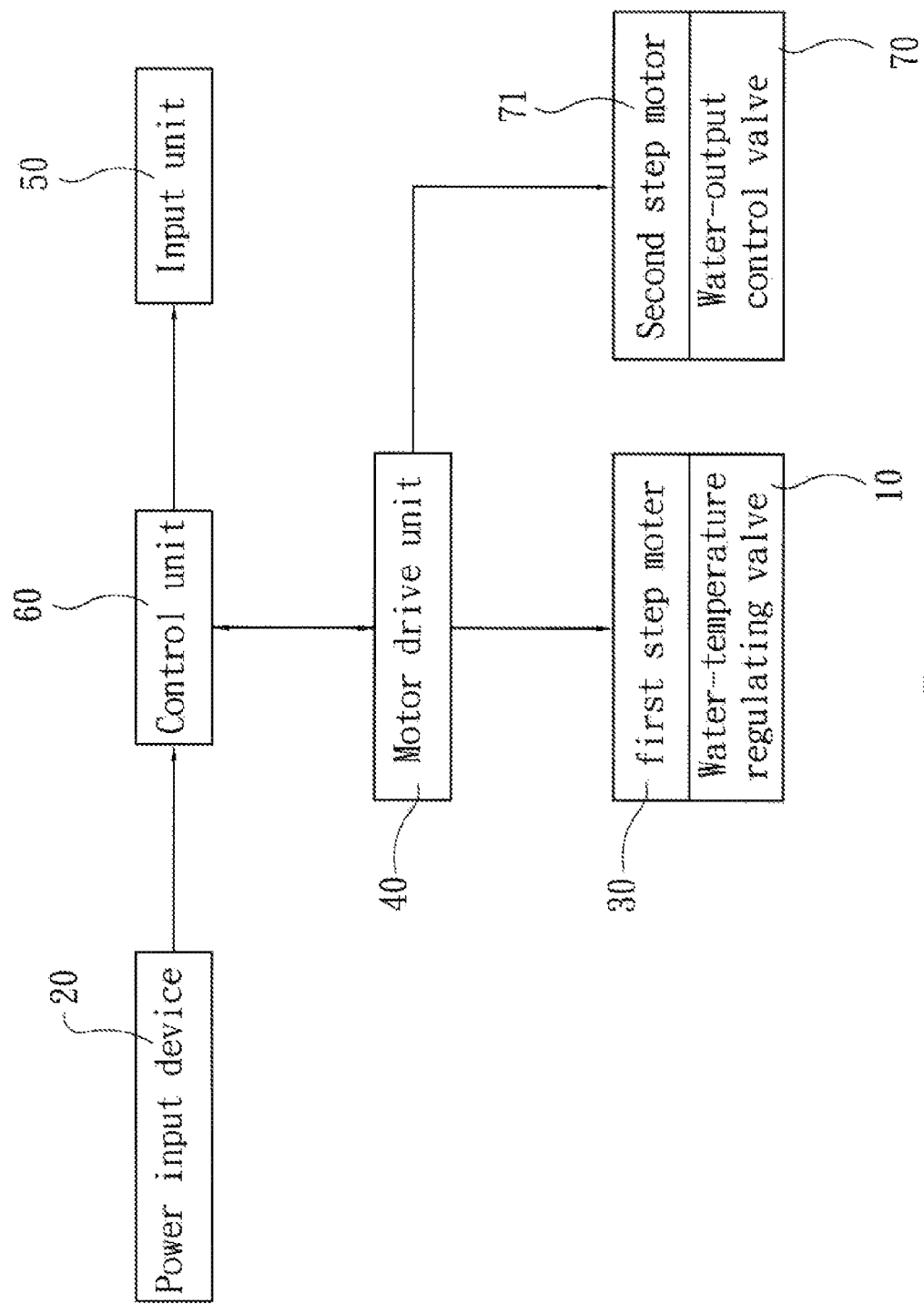
FIG. 3 is a schematic block diagram view of a second embodiment of the intelligent water outlet device in accordance with this disclosure.
Figure 4:
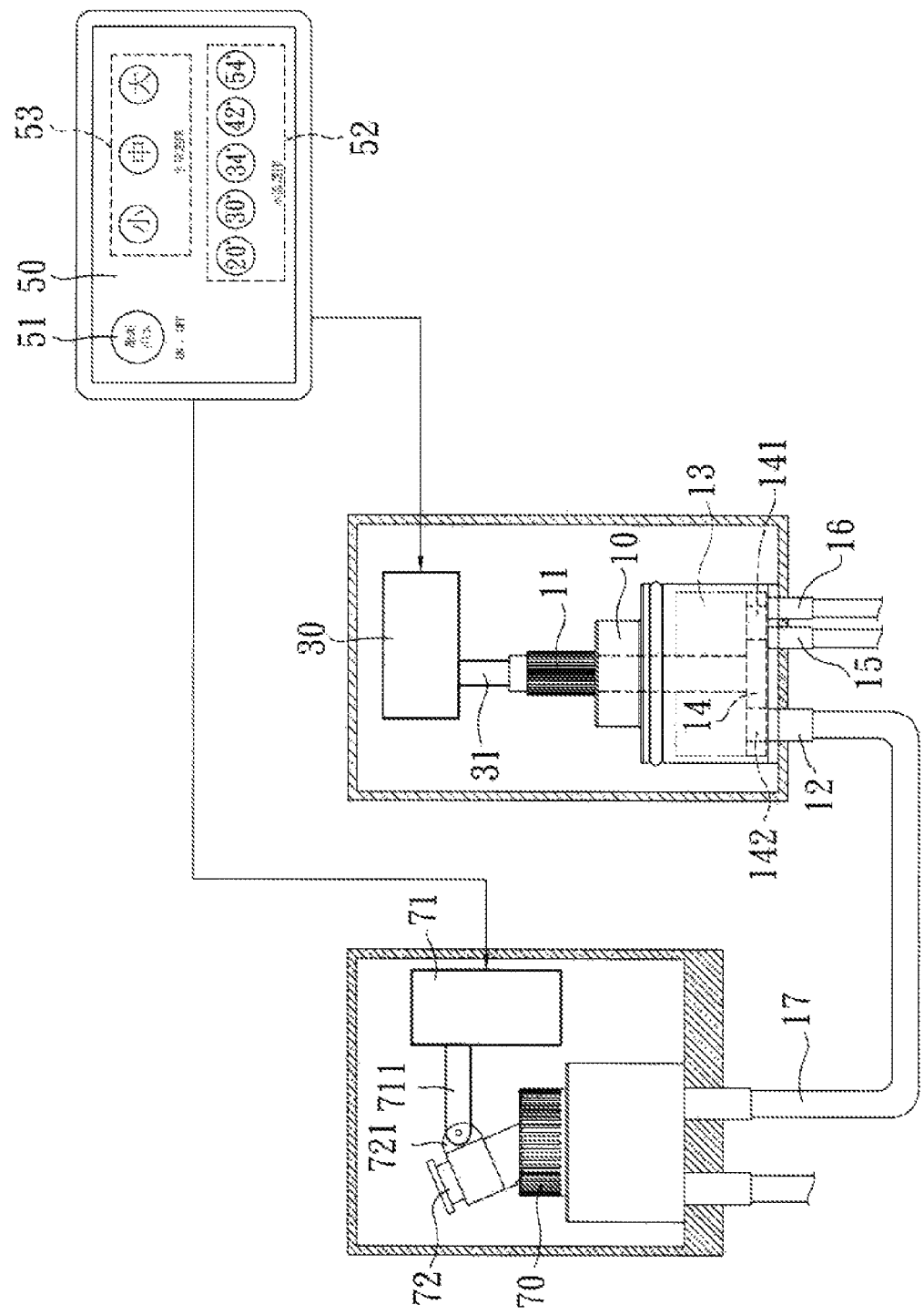
FIG. 4 is a schematic structural view of FIG. 3.

Refer now to FIG. 3 and FIG. 4. Another embodiment of this disclosure further includes a water outlet pipe 17, a water-output control valve 70 disposed at the water outlet pipe 17, and a second step motor 71. One end of the water outlet pipe 17 is connected with the water outlet 12 of the water-temperature regulating valve 10 so as to convey the warm water outputted from the water-temperature regulating valve 10 along the water outlet pipe 17. The water-output control valve 70 is further furnished with an oblique-push valve bar 72. As the valve bar 72 is in an inclination state, the warm water can be outputted. The water output by the water-supply adjusting valve 70 is determined by the angle of inclination of the valve bar 72. Since this water-output control valve 70 is a well-known art, thus details thereabout are omitted herein. The second step motor 71 has a telescoping power output shaft 711 pivotally connected with the valve bar 72 through a pivotal connector 721 mounted at the valve bar 72.

The input unit 60 is furnished with more than two water-feeding buttons 53 for different volume options to introduce water. In this embodiment, three water-feeding buttons 53 are provided for introducing small, medium and large water volumes. The control unit 60 can receive a message of the selected water volume at the input unit 50, and further have the motor drive unit 40 to drive the second step motor 71 accordingly. Thereupon, the power output shaft 711 of the second step motor 71 can protrude by a specific length to have the valve bar 72 of the output control valve 70 to reach a corresponding angle of inclination.

Figure 5:
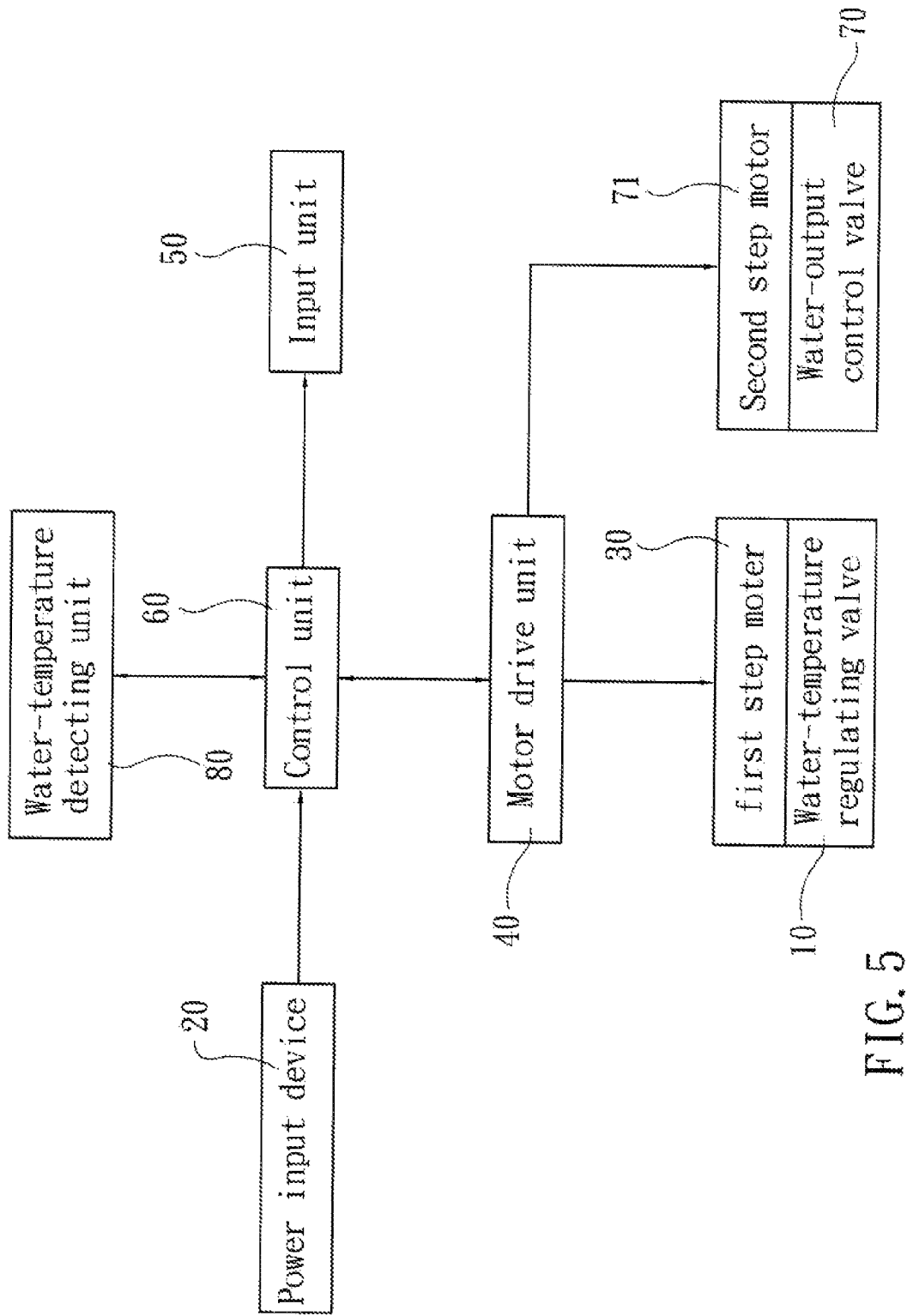
FIG. 5 is a schematic block diagram view of a third embodiment of the intelligent water outlet device in accordance with this disclosure.
Figure 6:
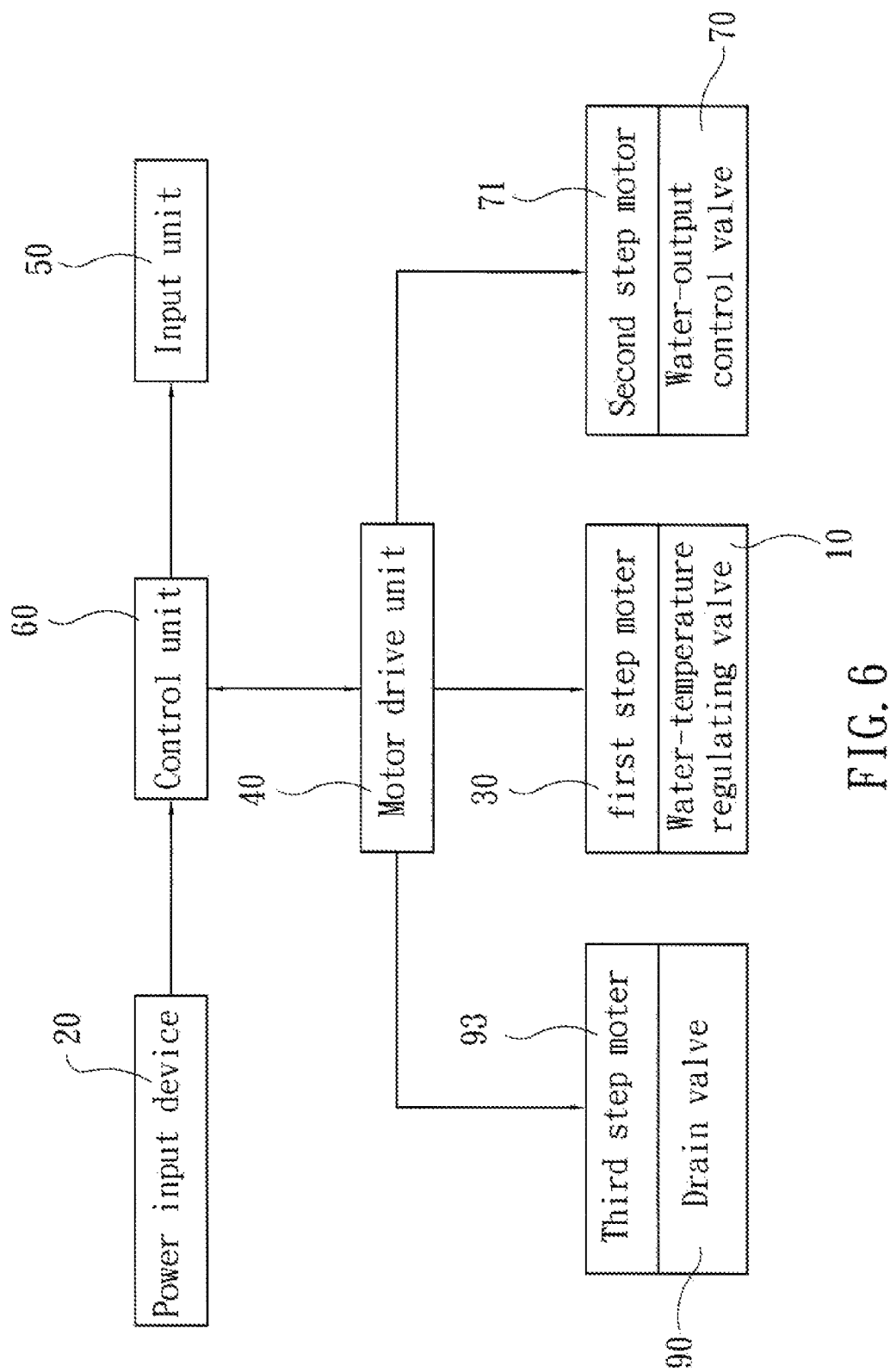
FIG. 6 is a schematic block diagram view of an improved embodiment upon FIG. 5 by integrating a drain control in accordance with this disclosure.
Figure 7:
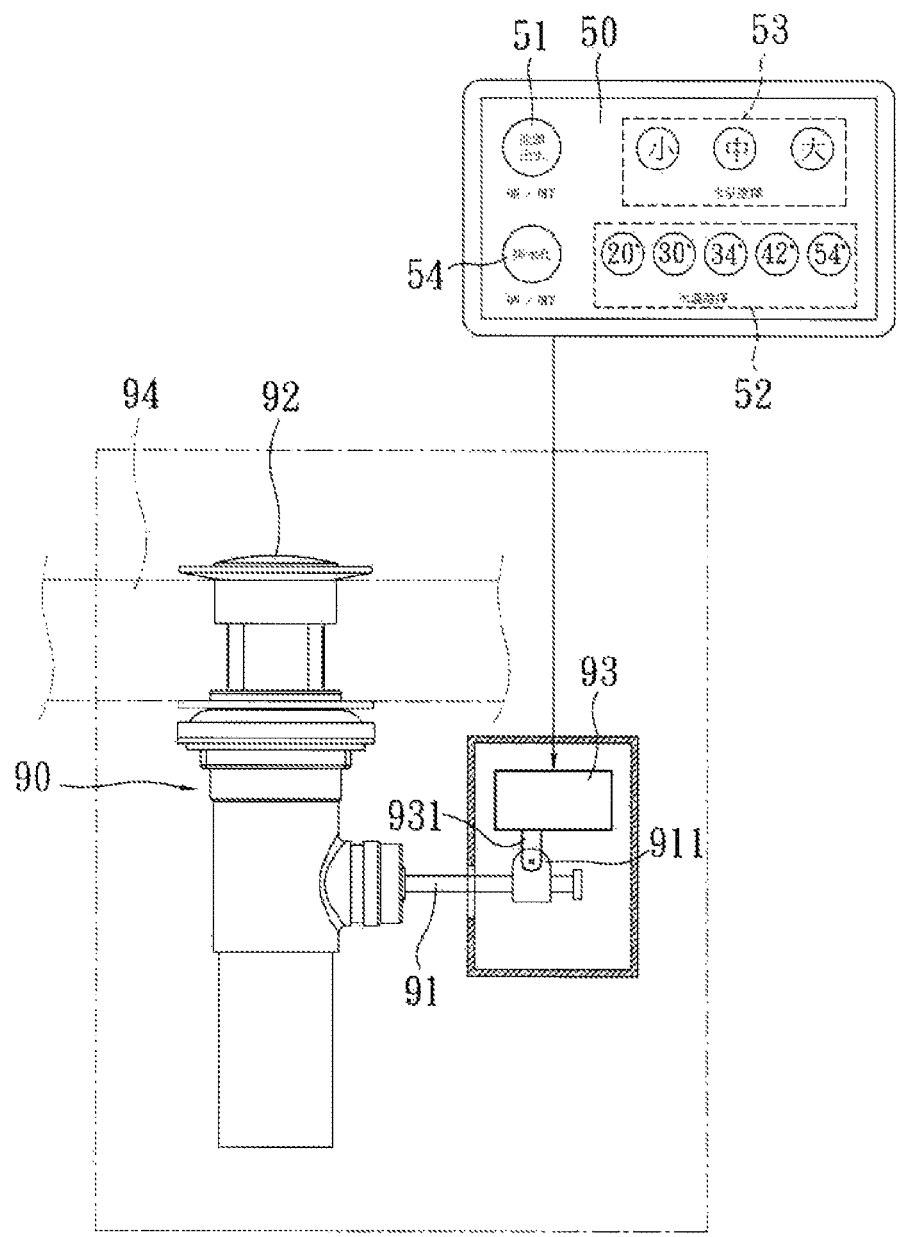
FIG. 7 demonstrates a state of this disclosure whose water plug is lowered to seal a corresponding drain hole.
Figure 8:
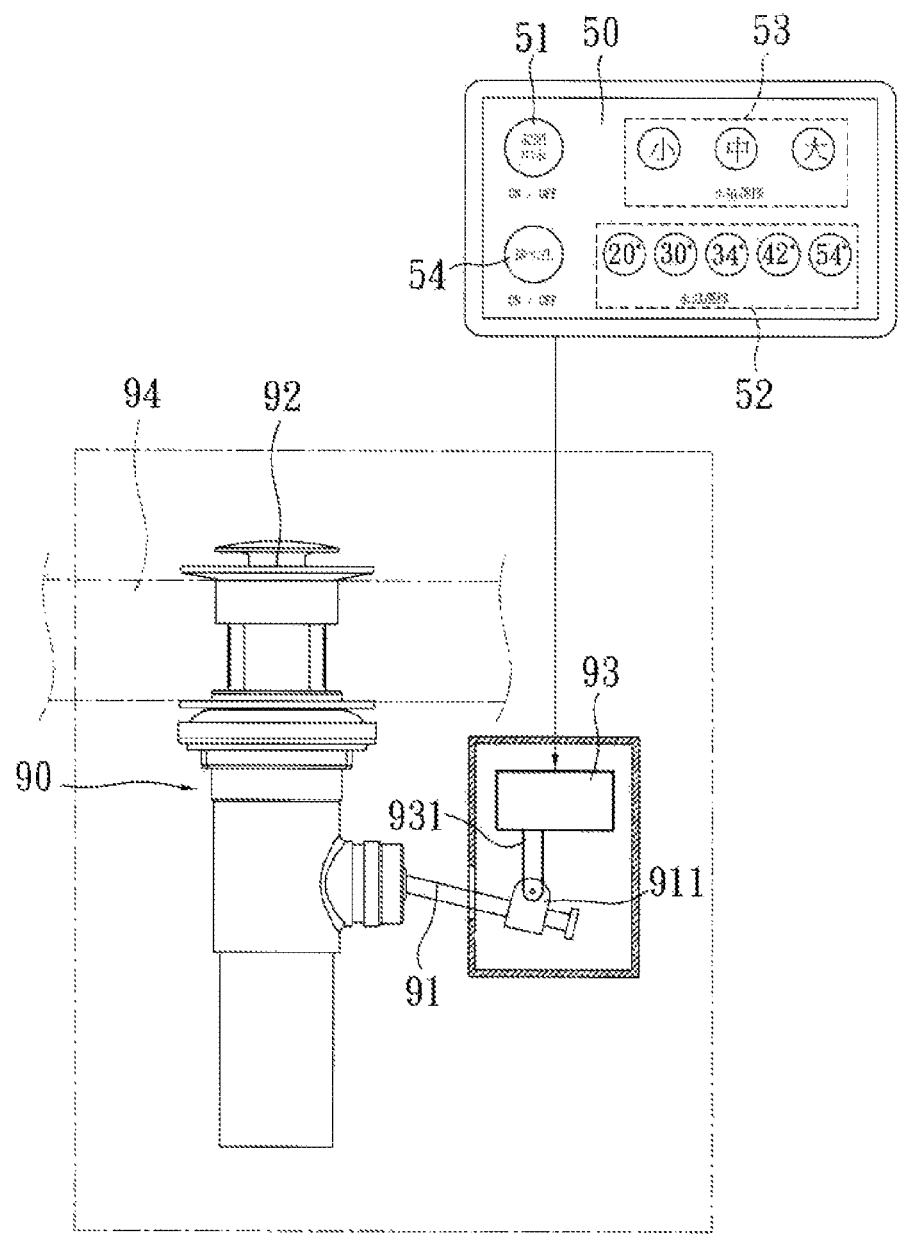
FIG. 8 demonstrates another state of FIG. 7 whose water plug is lifted up.

Referring now to FIG. 5, a schematic block view of a third embodiment of the intelligent water outlet device in accordance with this disclosure is shown. In this embodiment, a water-temperature detecting unit 80 is further included. This water-temperature detecting unit 80 can detect a real-time water temperature inside the water-mixing zone 13 of the water-temperature regulating valve 10, and further transmit a corresponding temperature message to the control unit 60. The control unit 60 can evaluate the inputted temperature value from the input unit 50 and the detected water temperature from the water-temperature detecting unit 80 so as to control the power output shaft 31 of the first step motor 30 to rotate till when the real-time water temperature and the inputted water temperature are equal.

If the temperature difference between the real-time water temperature and the inputted water temperature are determined to exceed a preset allowable temperature difference, the control unit 60 would transmit a message to the motor drive unit 40 to further activate the first step motor 30 till when the real-time water temperature is equal to the inputted water temperature. Then, the control unit 60 would transmit another message to the motor drive unit 40 to stop the first step motor 30. Thereupon, while in meeting a slight temperature change, no corresponding movement at the adjusting bar 11 of the water-temperature regulating valve 10 shall be made. Thus, the first step motor 30 needn't to react all the time for any temperature variation, and thereby the consumed energy can be substantially reduced. In this embodiment, the allowable temperature difference between the real-time water temperature and the inputted water temperature can be set as ±0.5° C. or the like.

In summary, the intelligent water outlet device provided by this disclosure utilizes electronically the intellectualized control to automatically adjust the mixing ratio of the cold and hot water for effectively controlling the temperature and water output of the water supply, such that objects in desired water temperature and water saving can be obtained.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An intelligent water outlet device, furnished with a water-temperature regulating valve having an adjusting bar and at least one water outlet, a mixing ratio of cold and hot water being adjusted by rotating the adjusting bar, comprising:

a power source unit, receiving a DC power to energizing the intelligent water outlet device;

an input unit, having at least two temperature buttons for inputting different temperature values;

a first step motor, having a rotational power output shaft coaxial and integrally connected with the adjusting bar of the water-temperature regulating valve, the power output shaft being used for rotating the adjusting bar;

a motor drive unit, used for driving the first step motor and providing the first step motor to perform a positive rotation, a negative rotation and a 0-degree calibration;

a control unit, used for receiving the temperature value inputted at the input unit, and transmitting a message to the motor drive unit for driving the power output shaft of the first step motor to rotate the adjusting bar of the water-temperature regulating valve to a corresponding angle so as to have the water-temperature regulating valve to output warm water having the inputted temperature value; and a water outlet pipe, a water-output control valve disposed at the water outlet pipe, and a second step motor; wherein one end of the water outlet pipe is connected with the water outlet of the water-temperature regulating valve; wherein the water-output control valve is furnished with an oblique-push valve bar for providing an angle of inclination to determine the water output of a water-supply adjusting valve; wherein the second step motor has a telescoping power output shaft driven by the motor drive unit, and the power output shaft is pivotally connected with the valve bar.

2. The intelligent water outlet device of claim 1, wherein the input unit is furnished with at least two water-feeding buttons for different water volumes, and the control unit drives the second step motor of the motor drive unit to protrude a power output shaft thereof by a predetermined length according to the inputted water volume at the input unit.

3. An intelligent water outlet device, furnished with a water-temperature regulating valve having an adjusting bar and at least one water outlet, a mixing ratio of cold and hot water being adjusted by rotating the adjusting bar, comprising:

a power source unit, receiving a DC power to energizing the intelligent water outlet device;

a first step motor, having a rotational power output shaft coaxial and integrally connected with the adjusting bar of the water-temperature regulating valve, the power output shaft being used for rotating the adjusting bar;

a motor drive unit, used for driving the first step motor and providing the first step motor to perform a positive rotation, a negative rotation and a 0-degree calibration;

an input unit, having at least two temperature buttons for inputting different temperature values;

a water-temperature detecting unit, used for detecting a real-time water temperature inside the water-temperature regulating valve and then transmitting the real-time water temperature to the control unit; and a control unit, used for receiving the temperature value inputted at the input unit and the real-time water temperature detected by the water-temperature detecting unit, transmitting a corresponding message to the motor drive unit for driving the power output shaft of the first step motor to rotate the adjusting bar till when the inputted temperature value is equal to the detected real-time water temperature, and then having the motor drive unit to stop the first step motor;

wherein, when a temperature difference between the inputted temperature value and the detected real-time water temperature exceeds a preset allowable temperature difference, the control unit has the motor drive unit to reactivate the first step motor till when the detected real-time water temperature is equal to the inputted water temperature, and then has the motor drive unit to stop the first step motor.

4. The intelligent water outlet device of claim 3, wherein the allowable temperature difference is ±0.5° C.

5. The intelligent water outlet device of claim 3, further including a water outlet pipe, a water-output control valve disposed at the water outlet pipe, and a second step motor; wherein one end of the water outlet pipe is connected with the water outlet of the water-temperature regulating valve; wherein the water-output control valve is furnished with an oblique-push valve bar for providing an angle of inclination to determine the water output of a water-supply adjusting valve; wherein the second step motor has a telescoping power output shaft driven by the motor drive unit, and the power output shaft is pivotally connected with the valve bar.

6. The intelligent water outlet device of claim 5, wherein the input unit is furnished with at least two water-feeding buttons for different water volumes, and the control unit drives the second step motor of the motor drive unit to protrude a power output shaft thereof by a predetermined length according to the inputted water volume at the input unit.

* * * * *